United States Patent
Post

(10) Patent No.: US 7,834,513 B2
(45) Date of Patent: Nov. 16, 2010

(54) ELECTROSTATIC GENERATOR/MOTOR HAVING ROTORS OF VARYING THICKNESS AND A CENTRAL STATOR ELECTRICALLY CONNECTED TOGETHER INTO TWO GROUPS

(75) Inventor: Richard F. Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 262 days.

(21) Appl. No.: 11/932,329

(22) Filed: Oct. 31, 2007

(65) Prior Publication Data

US 2009/0066298 A1 Mar. 12, 2009

Related U.S. Application Data

(60) Provisional application No. 60/971,186, filed on Sep. 10, 2007.

(51) Int. Cl.
*H02N 1/00* (2006.01)
(52) U.S. Cl. ........................ 310/309; 322/2 A
(58) Field of Classification Search ............... 310/309; 322/2 A; 318/116
See application file for complete search history.

(56) References Cited

U.S. PATENT DOCUMENTS

| | | | | |
|---|---|---|---|---|
| 2,194,839 A * | 3/1940 | Van De Graaff et al. | .... | 310/309 |
| 2,247,783 A * | 7/1941 | Massolle | .... | 361/289 |
| 2,523,689 A * | 9/1950 | Felici | .... | 310/309 |
| 3,210,643 A | 10/1965 | Else et al. | | |
| 3,629,624 A * | 12/1971 | Staudte | .... | 310/309 |
| 3,951,000 A | 4/1976 | Ferriss et al. | | |
| 4,126,822 A | 11/1978 | Wahlstrom | | |
| 4,225,801 A | 9/1980 | Parker, Jr. | | |
| 4,546,292 A | 10/1985 | Audren et al. | | |
| 4,595,852 A | 6/1986 | Gundlach | | |
| 4,622,510 A | 11/1986 | Cap | | |
| 4,754,185 A | 6/1988 | Gabriel et al. | | |
| 4,789,802 A | 12/1988 | Miyake | | |
| 5,237,234 A | 8/1993 | Jebens et al. | | |
| 5,248,930 A | 9/1993 | Taylor | | |
| 5,506,491 A | 4/1996 | Ford | | |
| 5,705,902 A | 1/1998 | Merritt et al. | | |
| 5,808,383 A | 9/1998 | Kostov et al. | | |
| 5,965,968 A | 10/1999 | Robert et al. | | |
| 6,353,276 B1 | 3/2002 | Gendron | | |
| 6,771,002 B2 | 8/2004 | Jones | | |

(Continued)

FOREIGN PATENT DOCUMENTS

JP 63-136982 * 6/1988

*Primary Examiner*—Karl I Tamai
(74) *Attorney, Agent, or Firm*—John P. Wooldridge

(57) ABSTRACT

A sub-module consists of a set of two outer sets of stationary fan-blade-shaped sectors. These outer sectors include conductive material and are maintained at ground potential in several examples. Located midway between them is a set of stationary sector plates with each plate being electrically insulated from the others. An example provides that the inner sector plates are connected together alternately, forming two groups of parallel-connected condensers that are then separately connected, through high charging circuit resistances, to a source of DC potential with respect to ground, with an additional connecting lead being provided for each group to connect their output as an AC output to a load. These same leads can he used, when connected to a driver circuit, to produce motor action.

22 Claims, 10 Drawing Sheets

U.S. PATENT DOCUMENTS

| | | |
|---|---|---|
| 6,858,962 B2 | 2/2005 | Post |
| 6,906,446 B2 | 6/2005 | Post |
| 7,230,364 B2 | 6/2007 | Odaka et al. |
| 2009/0066298 A1* | 3/2009 | Post .......................... 322/2 A |

* cited by examiner

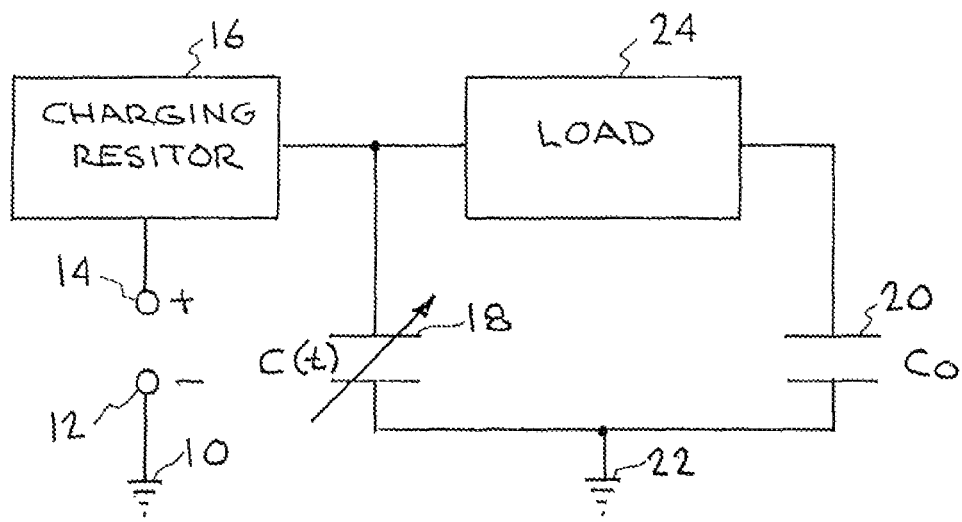
FIG. 1
(PRIOR ART)
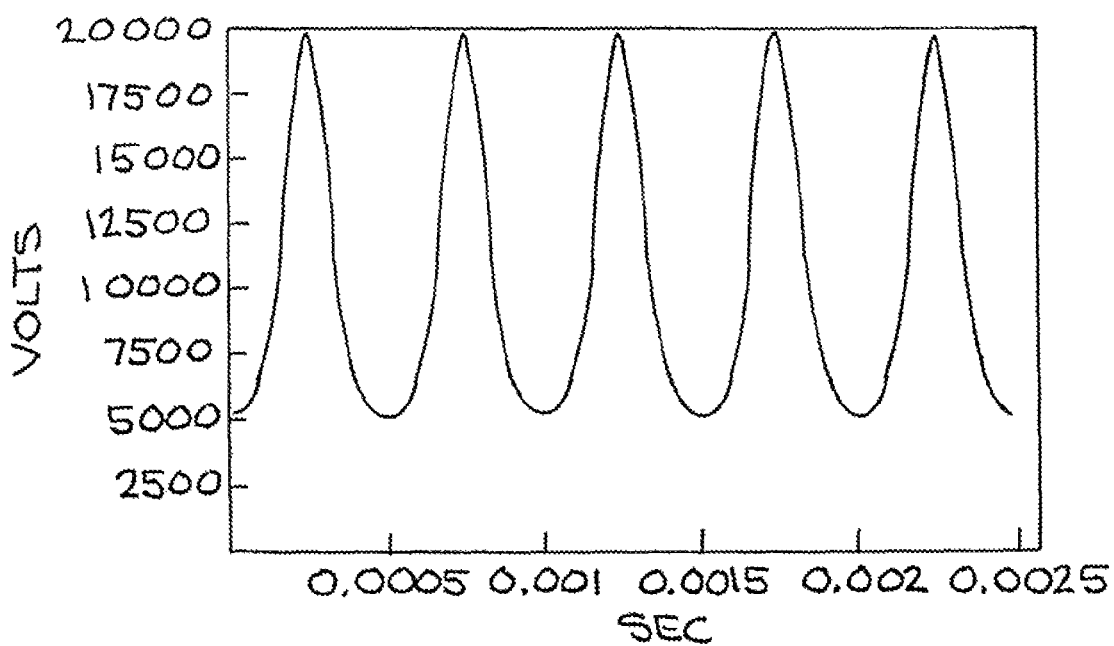
(PRIOR ART) FIG. 2

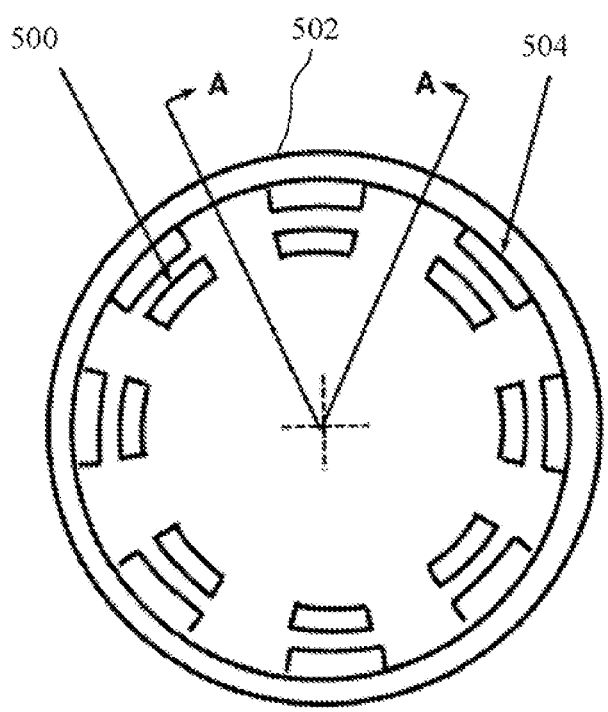
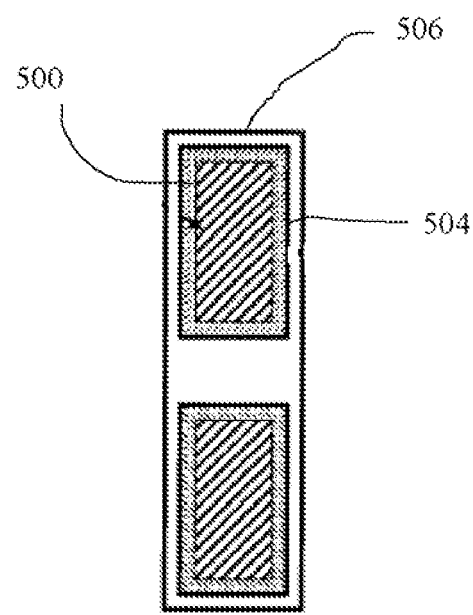
Figure 16A
Figure 16B

ELECTROSTATIC GENERATOR/MOTOR HAVING ROTORS OF VARYING THICKNESS AND A CENTRAL STATOR ELECTRICALLY CONNECTED TOGETHER INTO TWO GROUPS

This application claims priority to U.S. Provisional Patent Application Ser. No. 60/971,186, titled: "An Improved Electrostatic Generator/Motor", filed Sep. 10, 2007, incorporated herein by reference.

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to electrostatic generators and motors, and more specifically, it relates to the use of parametric resonance and variable thickness dielectric to improve the performance of such devices.

2. Description of Related Art

Early work (1,2) by Professor John Trump (of M.I.T.) examined theoretically and experimentally a then-new form of electrostatic generator/motor that was especially suitable for use in a vacuum environment. Subsequent workers (e.g., 3, 4) employed his ideas in their designs. Tramp's generator/motor consisted of interleaving fan-like condenser plates, consisting of "stators" and "rotors." The stator assembly was supported on insulators, and the rotor "fans" were mounted on a rotating shaft. As the rotor rotated, the capacitance between the stator and rotor would vary between a maximum value, when the blades were directly opposite to each other, to a minimum value when the rotor blades faced the gaps between the stator blades. In many of Trump's generator/motors, "brushes" made contact with the rotor blade shaft to provide a means of electrical connection to the rotor blade assembly. A typical "single-sided" circuit as employed by Trump is shown schematically in FIG. 1 and includes a negative power supply lead 12 connected to ground 10, a positive power supply lead 14 connected to a charging resistor 16, which is connected to the electrostatic generator/motor device 18 which is in parallel to capacitor 20. One side of each of the electrostatic generator/motor device and capacitor are connected to ground 22 and the other side of each is connected on opposite sides of a load 24.

To operate Trump's devices as a generator, a potential was established between the stator and rotor by connecting them to a DC power supply through a high-resistance "charging resistor". Once the condensers reached the full electrical potential, no further charge was drawn from the power supply. However, when the rotor was spinning, the potential between stator and rotor would have an alternating current component, as a natural consequence of the time variation of the capacitance, as given by the equation;

$$V[t] = \frac{Q_0}{C[t]}, \quad [1]$$

where $Q_0$ (coulombs) is the (fixed) charge on the condenser, and $C[t]$ (farads) is the capacity of the time-varying capacitor. The time-variation of capacity of an actual fan-like capacitor made up of a stationary and a rotating set of sector plates can be modeled reasonably well by the expression:

$$C[t] = C_0 \left( \frac{(1 + k\cos[\omega t])}{1 + k} \right), \quad k < 1, \quad [2]$$

where $C_0$ is the value of the capacity of the condenser at its maximum, and $\omega$ is the angular frequency of variation of the capacity as it cycles between its maximum and its minimum value.

Inserting Eq. 2 into Eq. 1, one can calculate the variation in potential for a given set of values for $Q_0$, $C_0$, k, and $\omega$. If we take $Q_0 = V_0 C[0]$ as the initial charge (at t=0, a time when the capacity has its maximum value), then we may plot the potential across the capacitor as a function of time (in the absence of any loads connected to its terminals. Such a plot is shown in FIG. 2, for a value of $C_0$=0.1 µfarad, $V_0$=5 kV, $\omega=2\pi*(10^3$ Hz), and k=0.6. As can be seen, a large AC component appears, superposed on the DC level The results shown in this plot represent the "driver" for the electrostatic generator/motor. It is desirable to make optimum use (both electrically and geometrically) of this driver in order to maximize the power output of the generator. As will be shown, the special rotor-stator configurations and circuits that are the subject of this disclosure represent a major improvement over the simple configurations studied by Trump and by others following him.

SUMMARY OF THE INVENTION

It is an object of the present invention to provide new embodiments of the electrostatic generator/motor.

This and other objects will be apparent based on the disclosure herein.

The invention is based on a sub-module consisting of a set of two outer sets of stationary fan-blade-shaped sectors. These outer sectors include conductive material and, although a variety of configurations are possible, are maintained at ground potential in several exemplary embodiments. Located midway between them is a set of stationary sector plates with each plate being electrically insulated from the others. An exemplary embodiment provides that the inner sector plates are connected together alternately, forming two groups of parallel-connected condensers that are then separately connected, through high charging circuit resistances, to a source of DC potential with respect to ground, with an additional connecting lead being provided for each group to connect their output (when used as a generator) as an AC output to a load. These same leads would be used, when connected to a driver circuit, to produce motor action. Several exemplary circuits for use with the sub-module are provided. In some exemplary embodiments, the sub-modules are duplicated and electrically connected to each other as many times as needed, in order to form a complete electrostatic generator/motor structure.

To cause the capacity between facing sector plates to vary periodically, a rotor of a disc-shaped annular ring made, e.g., of low-loss dielectric material, is interposed between the outer and inner sector plates. The thickness of this rotor is varied with the same period as that of the sector plates so that as the rotor rotates it will alternately impose a thick section of dielectric and then a thin section between a given facing pair of plates. The imposition of a dielectric in the space between the plates of a parallel-plate condenser causes its capacity to increase by a factor nearly equal to the dielectric constant of the material if the dielectric nearly fills the space between the plates. When only a thin sheet of dielectric is present, the change in capacity of a parallel-plate capacitor from its "vacuum" value will be small. Each sub-module employs such two rotors so as to impose a variable thickness of dielectric between each inner sector blade and the two sector plates on either side of it. This geometry produces facing pairs of variable condensers, electrically in parallel. As the two coupled rotors rotate, the capacity of each pair of condensers formed by the three sector plates varies periodically between a minimum and a maximum value determined by their area, the spacing between them, and the dielectric constant and thickness of the sections of the rotor.

Exemplary improved circuits for use with the sub-module take advantage of internal regenerative effects to increase the power output of the generator without requiring a corresponding increase in the charging power supply voltage. These improved circuits also provide an effective means for reducing the variation of output power that occurs upon changes in rotation speed of the generator, such as those associated with the extraction of energy from a flywheel rotor with which the generator/motor is integrated. The new circuits involve the addition of inductances to the charging circuits. These charging inductances are sized so that the band of resonant frequencies of the circuit composed of the charging inductance and the (variable) capacity of the electrostatic generator/motor overlaps the output frequency of the generator. In this circumstance a "parametric resonance" occurs that can act to greatly increase the AC voltage and power output of the generator, without the need to increase the voltage of the charging supplies. This parametric resonance effect can also be employed to compensate for the reduction in output power that would otherwise occur as the speed decreases (as in the discharge of a flywheel energy storage system).

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 1 shows a typical "single-sided" circuit as employed by Trump.

FIG. 2 is a plot of the potential across the capacitor of FIG. 1 as a function of time.

FIG. 7 shows the buildup up in total charge on the condensers by current flow through the charging resistors when the charging DC power supply was turned on.

FIG. 16A shows a top view of an electrostatic generator/motor with a vertical array of stationary electrodes and a rotor made of insulating material.

FIG. 16B shows section A-A of FIG. 16A.

DETAILED DESCRIPTION OF THE INVENTION

Figure 3:
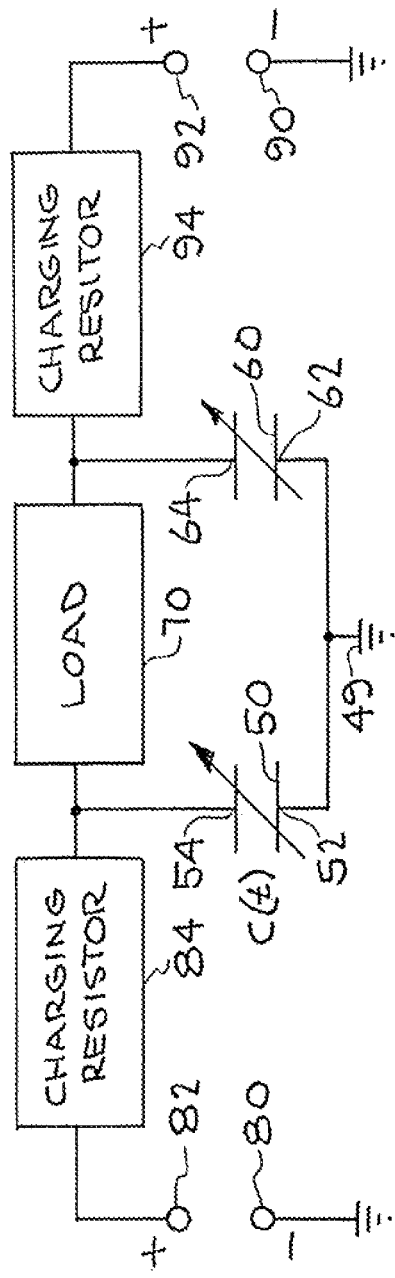
FIG. 3 shows a "balanced" the electrical circuit of an embodiment of the present invention operated as a generator.

FIG. 3 shows the electrical circuit of an embodiment of the present invention, that when operated as a generator, could be described as a "balanced" circuit, in that it generates (across a load resistor or its equivalent, such as a transformer primary the secondary of which is connected to a circuit to be powered) an AC voltage that can, e.g., be rectified to produce a plus and minus DC potential. This DC output could then be used, for example, to drive an inverter to produce an AC power output. In the circuit, variable capacitor 50 is connected at point 52 to ground 49. Variable capacitor 60 is connected at point 62 also to ground 49. The other side of variable capacitor 50 is connected into the circuit at point 54. The other side of variable capacitor 60 is connected into the circuit at point 64. Points 54 and 64 are connected to opposite sides of a load resistor 70 (or an equivalent or substitution). A first charging circuit consists of a grounded negative power supply lead 80 and a positive power supply lead 82 connected to a charging resistor 84 which is electrically connected to the circuit to point 54. A second charging circuit consists of a grounded negative power supply lead 90 and a positive power supply lead 92 connected to a charging resistor 94 which is electrically connected to the circuit to point 64.

Figure 4A:
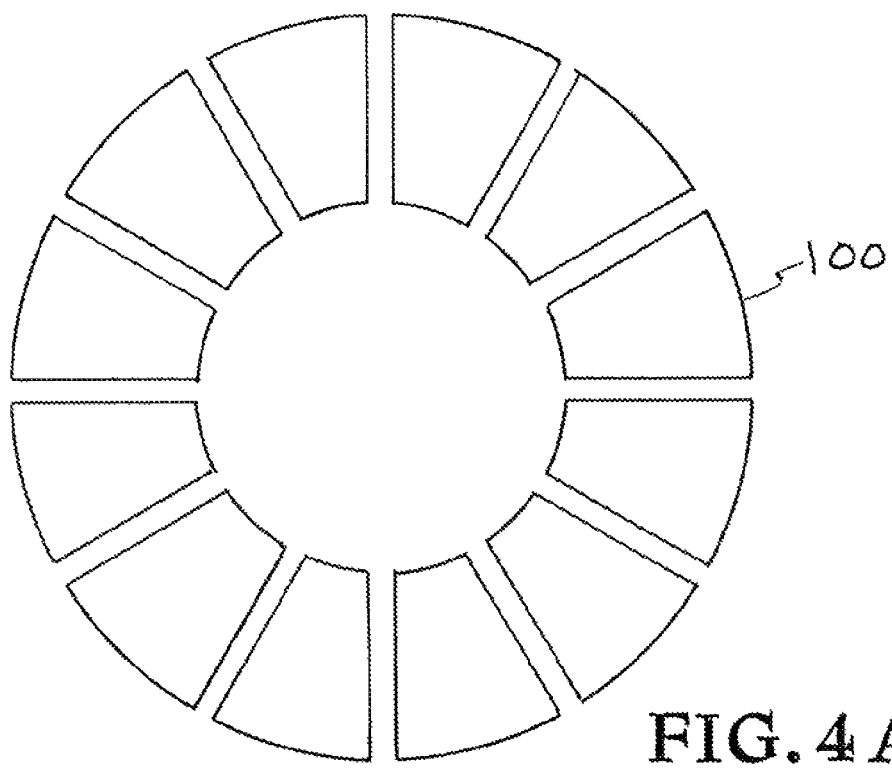
FIG. 4A illustrates a top view of an exemplary sub-module of an embodiment of the present generator/motor.
Figure 4B:
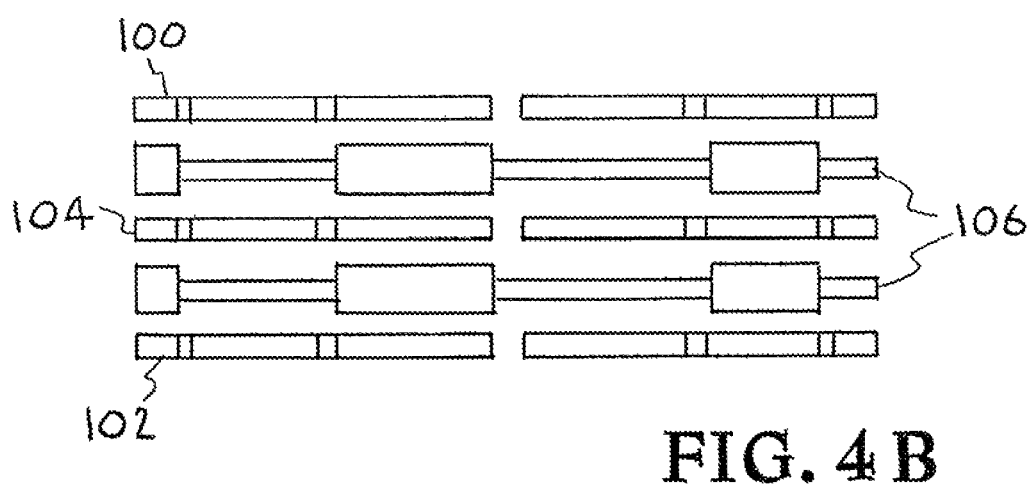
FIG. 4B is a side view of the embodiment of FIG. 4A and illustrates a way that the thickness of this rotor can be varied with the same period as that of the sector plates.

FIG. 4A illustrates a top view and FIG. 4B a side view, of an exemplary sub-module of an embodiment of the present generator/motor. The sub-module consists of a set of two outer "reference" sets of stationary fan-blade-shaped sectors 100 and 102. These outer "reference" sets of stationary fan-blade-shaped sectors are made of thin metal in some embodiments. In other embodiments, the outer sets of stationary fan-blade-shaped sectors contain conductive material such as metal, but may not he composed 100% of such material. Where this application refers to embodiments of the outer sector plates as comprising of or as being made of thin metal or metal, it should be understood that other materials may be present and the plates should include some conductive material but not necessarily 100%. In some embodiments, these two sets of sector plates (100 and 102) are maintained at ground potential. Located midway between them is a set of stationary sector plates 104, with each plate being electrically insulated from the others.

In one embodiment of the "balanced-circuit" version of the invention, the inner sector plates are connected together alternately, forming thereby two groups of parallel-connected condensers. These two groups will then be separately connected (through high "charging circuit" resistances) to a positive (or negative) source of DC potential with respect to ground, with an additional connecting lead being provided for each group to connect their output (when used as a generator) as an AC output to a load. These same leads would be used, when connected to a driver circuit, to produce motor action. This embodiment could use the circuit of FIG. 3. For example, one group of alternately connected sector plates of stationary sector plates 104 could be electrically connected to point 54 and the other group of stationary sector plates 104 could be connected to point 64. Both grounded sector plates 100 and 102 could be electrically connected to ground 49. To produce motor action, the leads from points 54 and 64 could be connected to a driver circuit, which is discussed in more detail below.

In another embodiment the two paired groups of the sector blades in a single module will be connected, again via charging resistors, one to a source of positive potential and one to a source of negative potential with respect to ground. In such cases, each sub-module will be paired with another, adjacent, sub-module, to form another configuration of the "balanced" generator/motor circuit.

In either of the above embodiments the units could be duplicated (and electrically connected to each other) as many times as needed, in order to form the complete electrostatic generator/motor structure.

Referring to FIG. 4B, to cause the capacity between facing sector plates to vary periodically, a special "rotor" 106 consisting of a disc-shaped annular ring made, e.g., of low-loss dielectric material, is interposed between the outer and inner sector plates. As also shown schematically FIG. 4B, the thickness of this rotor is varied with the same period as that of the sector plates. Thus, as the rotor rotates it will alternately impose a thick section of dielectric and then a thin section between a given facing pair of plates. The imposition, of a dielectric in the "vacuum" space between the plates of a parallel-plate condenser causes its capacity to increase by a factor nearly equal to the dielectric constant of the material if the dielectric nearly fills the space between the plates. Similarly, when only a thin sheet of dielectric is present, the change in capacity of a parallel-plate capacitor from its "vacuum" value will be small.

Note that in some cases it may be advantageous to replace the dielectric rotor described above with a metallic one having the same configuration. The advantage of using metallic rotors resides in the ability to obtain higher maximum-to-minimum capacitance ratios with the same gap variations. The disadvantages include the usually inferior voltage-holding characteristics of a purely vacuum gap, as opposed to one containing a dielectric, the need for smooth highly polished surfaces for both stator and rotor and the increased weight of the rotor (a concern in high-speed applications).

Returning to the description of a generator/motor modular unit each such unit would employ two rotors such as the one described above, so as to impose a variable thickness of dielectric between each inner sector blade and the two sector plates on either side of it. The effect then will be to produce facing pairs of variable condensers, electrically in parallel. As the two coupled rotors rotate, the capacity of each pair of condensers formed by the three sector plates (two outer sector plates plus a single sector plate between them) will vary periodically between a minimum and a maximum value determined by their area, the spacing between them, and the dielectric constant and thickness of the sections of the rotor.

Returning to a discussion of a sectored rotor plate, a simple equation can be derived to evaluate the change in capacity as a function of the area of the sector plates, the gap between them, and the fraction of the space between them that is filled with a material with a dielectric constant equal to $K \gg 1$. This equation is:

$$C_s = \varepsilon_0 A K \left[ \frac{1}{s_K + K s_V} \right] \text{Farads} \qquad [3]$$

Here the gap between the plates $=s$ (meters) with $s_v$ (meters) =thickness of vacuum gap and $s_K$ (meters)=thickness of dielectric gap, so that the total gap=s with the equation: $s = s_v + s_K$. The quantity A (m$^2$) is the area of each sector plate. The quantity $\varepsilon_0 = 8.85 \times 10^{-12}$ (farads/meter) is the permittivity of vacuum.

Taking, for example, K=6 and s=0.015 meters, if at first $s_v$=0.001 m, $s_K$=0.014 m, and then vice-versa, the ratio of the maximum to minimum capacity is given by equation 4.

$$\frac{C_s(\max)}{C_s(\min)} = \frac{s_{K2} + K s_{v2}}{s_{k1} + K s_{v1}} = 4.25 \qquad [4]$$

In the example, the capacitance ratio can be seen to be comparable to the dielectric constant of the dielectric itself.

To complete the description of the new forms of electrostatic generator/motor systems, two important features of the designs that have not been discussed will be mentioned.

The first feature has to do with the behavior of dielectrics that are subjected, in vacuum, to a constant DC electric field. In such cases, surface charges may accumulate on the surfaces of the dielectric. These surface charges can in some cases cause deleterious effects, such as perturbing the imposed electric field and/or leading to electrical discharges or electrical breakdown of the vacuum gap or the dielectric itself. In the embodiments described above this surface charge accumulation will be inhibited when the surfaces of the dielectric stator are subjected to electric fields that periodically reverse in direction. In some of the configurations this effect will occur automatically. In those where it does not normally occur, it can be made to occur by electrically isolating the upper and lower parts of the stator and rotor sector-plate assemblies (of a horizontal-axis system) from each other, and then connecting them, respectively, to positive and negative charging potentials with respect to ground. In this case the direction of the electric field in the sectors of the dielectric stator will reverse at least once as the rotor rotates by 360°. (In the previous case the change in direction of the field will occur every time each sector blade rotates to its next sector location.)

The second feature of the design has to do with the use of the system as a motor rather than as a generator. Motor action will always occur if a properly phased periodically varying potential is applied between the central stator plates and the grounded plates on either side of them. The "proper phase" is defined by the time when the thicker part of the dielectric is entering the gap between the stator plates. In this case, the effect of the applied electric field will be to pull, the dielectric into the region between the sector plates. If the field is then turned off as the thick section of the dielectric moves out from between the plates, and if it varies periodically at the same frequency as that defined by the motion of each sector plate by a reference position (i.e., "n" times the basic rotation frequency of the rotor, where n is the number of thick sectors on the dielectric rotor) then, once rotating, the system will continue to act as an electrical motor. A problem arises in determining a way to start such a system from rest purely by the use of electric potentials introduces from outside the system. The solution to this problem is that startup can always be initiated if it is known that the stator position is such that the thick dielectric sections are displaced from the centered position with respect to the sector plates. To insure that this will always be the case, no matter at what angular position the rotor resides at rest, requires only that two or more of the rotor (or stator) groups of elements along the length of the assembly be displaced in phase by an angle smaller than the angle represented by the width of one stator plate. In this case at least one of these sub-groups of elements will be phased so as to initiate rotation, so that, knowing this at-rest angular position (for example, determinable by capacity measurements on the stator) the phase and time-varying frequency of an AC applied voltage that will accelerate the rotor from rest to its operating speed can be determined.

Computer codes have been written to simulate the performance of the new generator/motors and to provide quantitative comparisons between their performance and that of the earlier, Trump-type, systems. Parameter values of capacities, resistances, and voltages were used that would be representative of those encountered in real applications, for example, in an energy storage system based on the use of fiber-composite flywheels. The results of these calculations will be summarized below.

For the cases shown the basic parameters were the following: The capacity value of the variable capacity when at its maximum was 0.15 microfarads, the maximum-to-minimum capacity ratio was the same as that given in Equation 4 (5.95), the charging voltage was 5.0 kV, and the operating frequency was 2.0 kiloHz (n/2 times the rotation frequency, where n is the number of blade sectors in one sector plate. For this example n was taken to be 20, corresponding to a rotor speed of 12000 RPM. The load resistance (optimized in the calculation) was 2200 ohms.

Figure 5A:
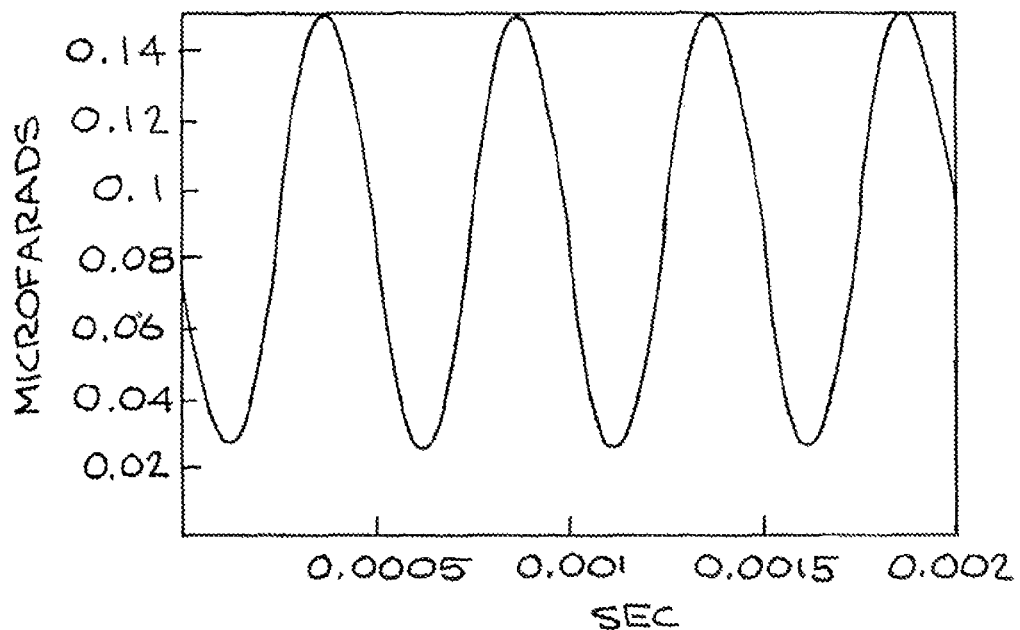
FIGS. 5A shows the calculated time variation of capacity of one of the two condensers of the balanced circuit shown in FIG. 3.
Figure 5B:
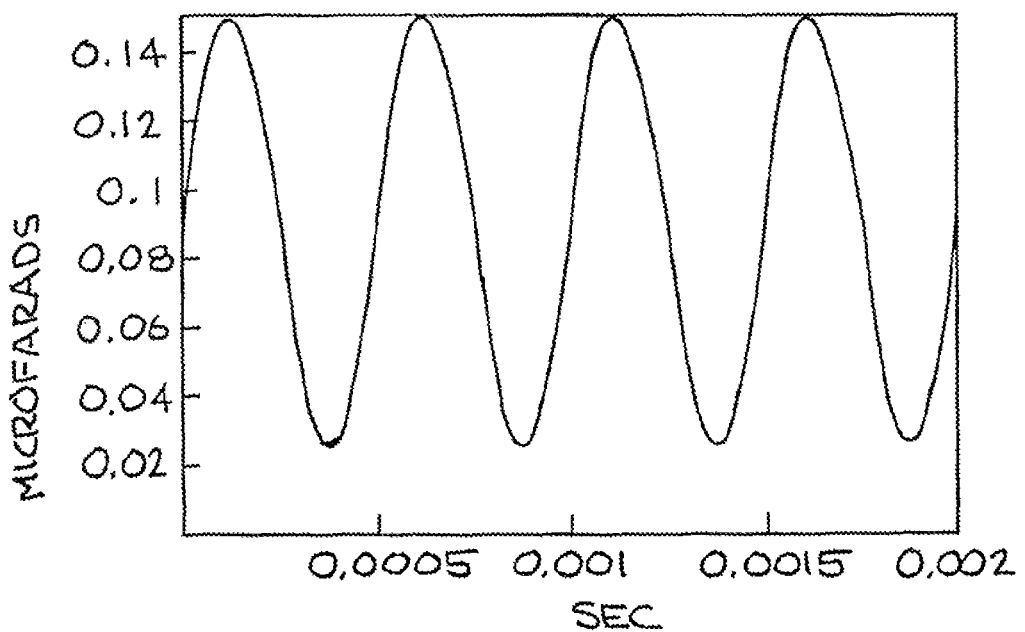
FIG. 5B show the calculated time variation of capacity of a second of the two condensers of the balanced circuit shown in FIG. 3.
Figure 6:
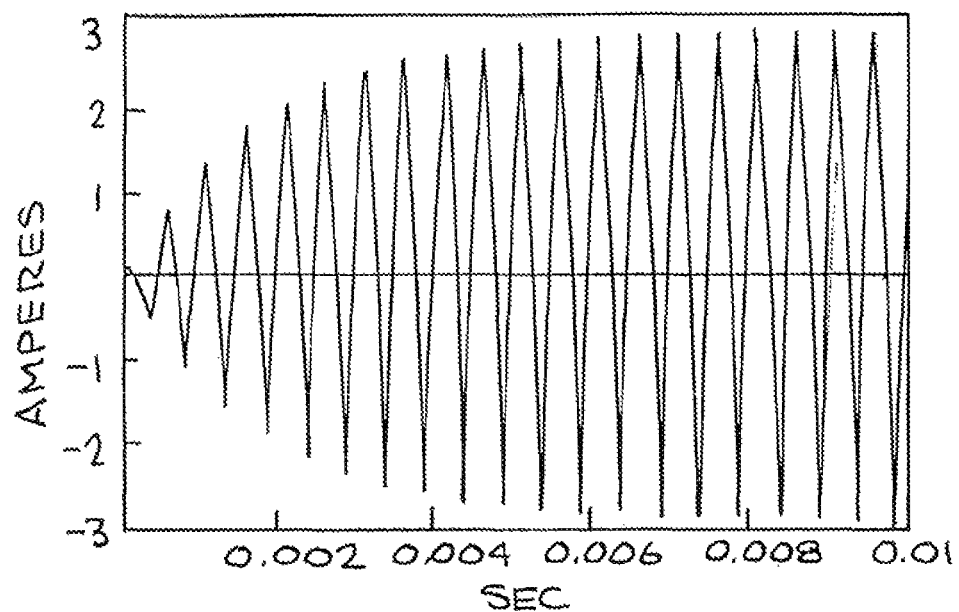
FIG. 6 shows the waveform and amplitude of the current across the load resistor, from which the rms AC power output of the generator can be calculated.
Figure 7:
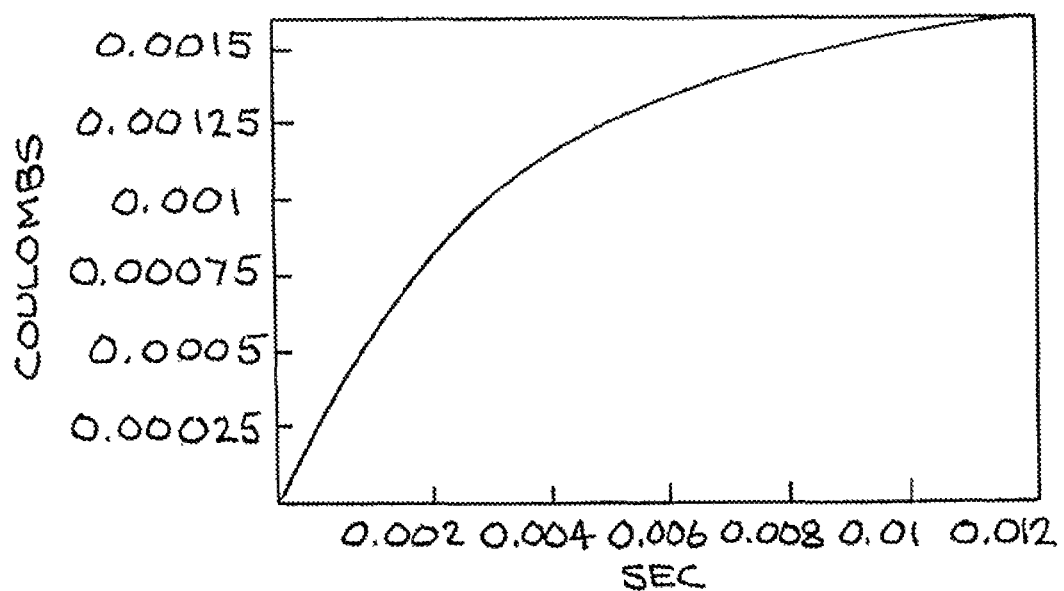

FIGS. 5A and 5B show the calculated time variations of capacity of the two condensers of the balanced circuit shown in FIG. 3. Note the phase displacement (by 180°) of the capacity of FIG. 5A from that of FIG. 5B. FIG. 6 shows the waveform and amplitude of the current across the load resistor, from which the rms AC power output of the generator can be calculated. Note the symmetrical AC-wave character of the output, a consequence of using the "balanced" circuit configuration. Note also the buildup of the current peaks with time as the condensers charge up through the charging resistors. This buildup of charge is shown directly in FIG. 7, which shows the buildup up in total charge on the condensers by current flow through the charging resistors when the charging DC power supply was turned on. Note that after the condensers are charged, no further power is required from the charging power supply.

Figure 8:
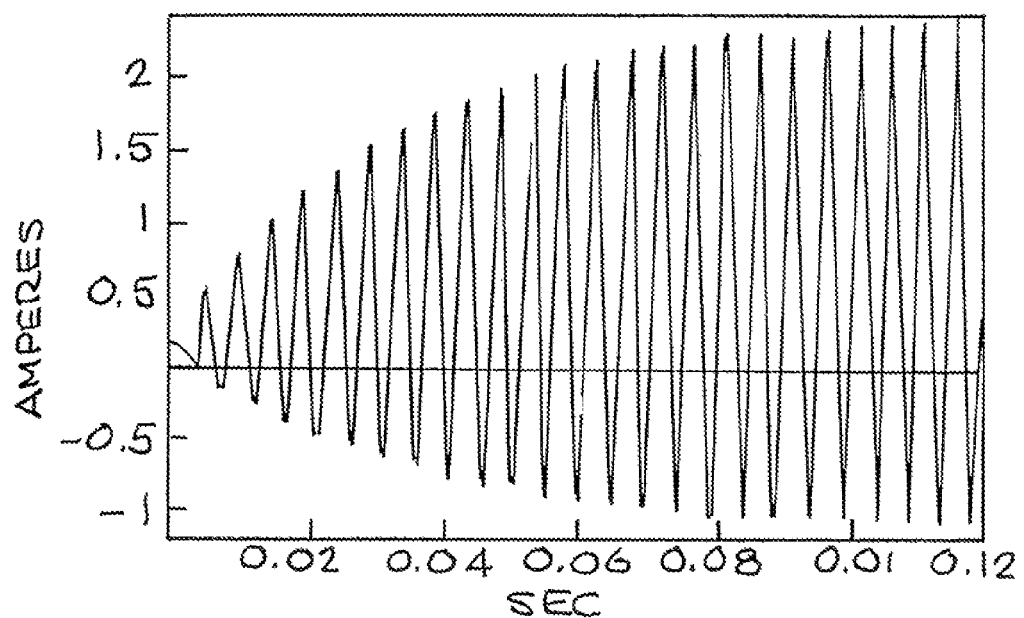
FIG. 8 shows the inferior AC output waveforms generated by the Trump-type configuration, leading to an inevitable loss in efficiency in the conversion circuits.

For the above parameters the calculated output power was 7.8 kW. If the same condensers are now employed, reconfigured into a typical Trump-type single-ended circuit, there are now two separate outputs, each now 2.7 kW, for a total power output of 5.4 kW, i.e., about 70 percent of the power the same condensers would produce in the balanced configuration. In addition, the use of the condensers in the Trump-type configuration would require twice as many power conversion and motor-drive circuits. Also the AC output waveforms generated by the Trump-type configuration, as shown in FIG. 8, are much inferior to those of the balanced configuration, leading to an inevitable loss in efficiency in the conversion circuits.

In common with other electrostatic generator/motor systems, the electrical efficiency of the generator/motor system should be very high, as there are no hysteresis or eddy-current losses as in electromagnetic-type generator/motor systems. Also, operation in a vacuum will eliminate aerodynamic losses. The only losses of any consequence will be those of the power conversion equipment. Using modern solid-state components these efficiencies should be very high, of order 98 percent or higher. For the balanced configuration, the improved AC waveforms, as compared to Trump-type systems, should also enhance the efficiency.

One other important feature of the electrostatic generator is the ease with which its output can be controlled, simply by variation of the charging potential. This ease of control is not as readily accomplished with an electromagnetic generator employing permanent magnets to produce its fields. The controllability of power output of the electrostatic generator has another important ramification for those situations, such as their use in a flywheel bulk energy storage system intended for diurnal use, with charging during part of the day, followed perhaps by an hours-long storage time. During such times it is important that losses of stored energy need to be minimized. By turning off the charging supplies and draining the charge off the condensers the standby losses from the generator would be reduced to zero.

An improved electrostatic generator/motor system has teen described with novel features and improved output power and efficiency over prior art. This new system is particularly suited for integration into a flywheel-based "bulk" energy storage system to provide a simple and highly efficient energy conversion system for energy storage applications, where conversion efficiencies can be made to be very high, and simple control of the output voltage is possible. This flexibility of control can be used, for example, to compensate for the slowing-down of the rotor speed of the flywheel as power is drawn from it. If also can be used to eliminate standby losses from the generator during "storage" times, when no power is being drawn from the system.

An improved version of the electrostatic generator/motor is described above, together with electrical circuits for charging the condensers of the generator/motor extracting energy from it in the generator mode. Improved circuits are described below for these functions. These circuits take advantage of internal "regenerative" effects. These effects operate to increase the power output of the generator substantially without requiring a corresponding increase in the charging power supply voltage. These improved circuits also provide an effective means for reducing the variation of output power that occurs upon changes in rotation speed of the generator, such as those associated with the extraction of energy from a flywheel rotor with which the generator/motor is integrated.

Figure 10:
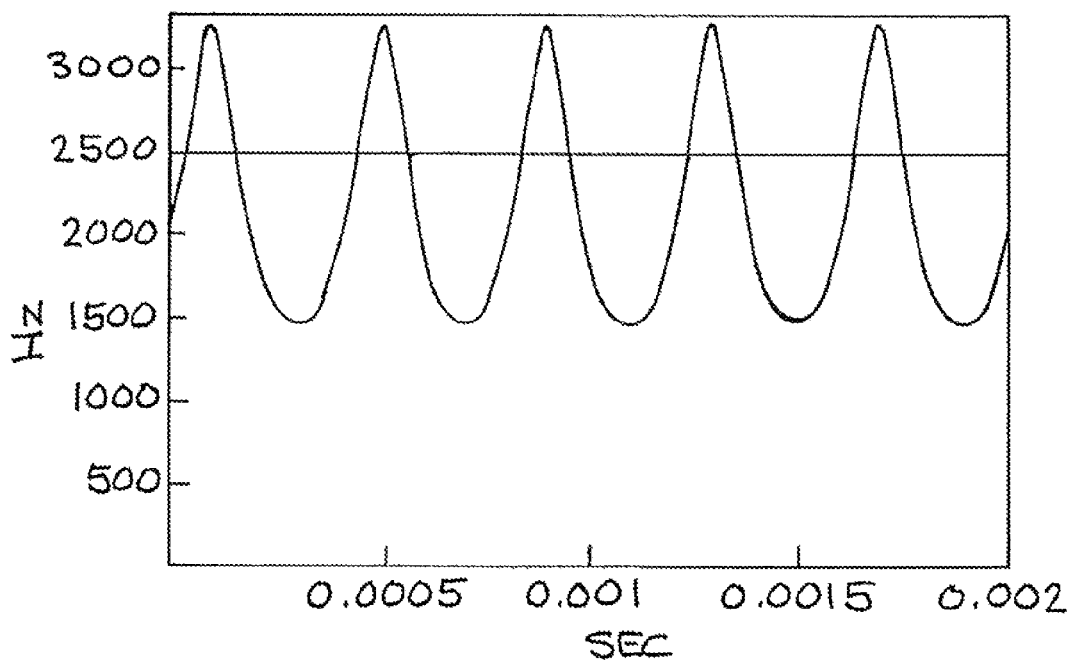
FIG. 10 is a plot of the (time-varying) resonant frequency of the above-described circuit, together with a line representing the generator output frequency in a case where the effect of parametric resonance is strong.

The new circuits involve the addition of inductances to the charging circuits, which in the earlier embodiment employed only charging resistors. These charging inductances are sized so that the band of resonant frequencies of the circuit composed of the charging inductance and the (variable) capacity of the electrostatic generator/motor overlaps the output frequency of the generator. FIG. 10 shows the band of resonant frequencies of the circuit that varies between a maximum value of about 3300 Hz and a minimum value of about 1500 Hz. This band of resonant frequencies shown in FIG. 10 overlaps the generator output frequency of 2500 Hz which is shown as a flat line in the figure. In this circumstance a "parametric resonance" occurs that can act to greatly increase the AC voltage and power output of the generator, without the need to increase the voltage of the charging supplies. This parametric resonance effect can also be employed to compensate for the reduction in output power that would otherwise occur as the speed decreases (as in the discharge of a flywheel energy storage system). Finally, the parametric resonance enhancing effect can also operate in reverse. That is, application of exciting power at a proper frequency and phase to the generator/motor in its motor mode will result in a resonant enhancement of the power transfer rate over that that would occur in the absence of the inductances.

The phrase "parametric resonance" applies to mechanical or electrical systems one or more parameters of which are periodic functions of time. If, in addition, the system exhibits resonant behavior (for example a weight hanging on a spring, or an inductor and a capacitor connected in series or in parallel), the phenomenon of parametric resonance can drive an initial small-amplitude oscillation of the system to higher and higher amplitudes until limited by the rate of extraction of energy from the system, by an external "load," Necessary conditions for this phenomenon to occur are: (1) that the periodic rate of variation of the parameter, for example, the time rate of variation of the capacitor in a circuit of a capacitor and an inductor connected in series or parallel, should lie within the range of variation of the resonant frequency of the inductor/capacitor circuit, as determined by the time variation of the value of the capacitor, and (2) that the circuit should have been previously excited, for example by putting an initial charge on the capacitor. When these two conditions are satisfied the amplitude of oscillation of the circuit can grow exponentially with time, until it becomes limited by the rate at which it is extracted from the system by, for example, a "load" resistor. In this example the source of the energy that feeds the growing oscillation is the mechanical work required to vary the capacitor between its minimum and maximum value.

A perhaps more familiar example of the phenomenon of parametric resonance can be seen in a child's playground swing. Starting from an initial small amplitude of swinging motion, the child can "pump" up the amplitude of swinging by periodically bending and straightening up his knees. By this motion the parameter he is changing is the "length" of the pendulum, as defined by the distance from, the top of the ropes supporting the swing seat to the center of mass of the pendulum, (the child). As the child alternately drops down (bends his knees) and rises up (straightens his knees) he is doing mechanical work that is then converted to an increase in amplitude of the swinging motion.

Figure 9:
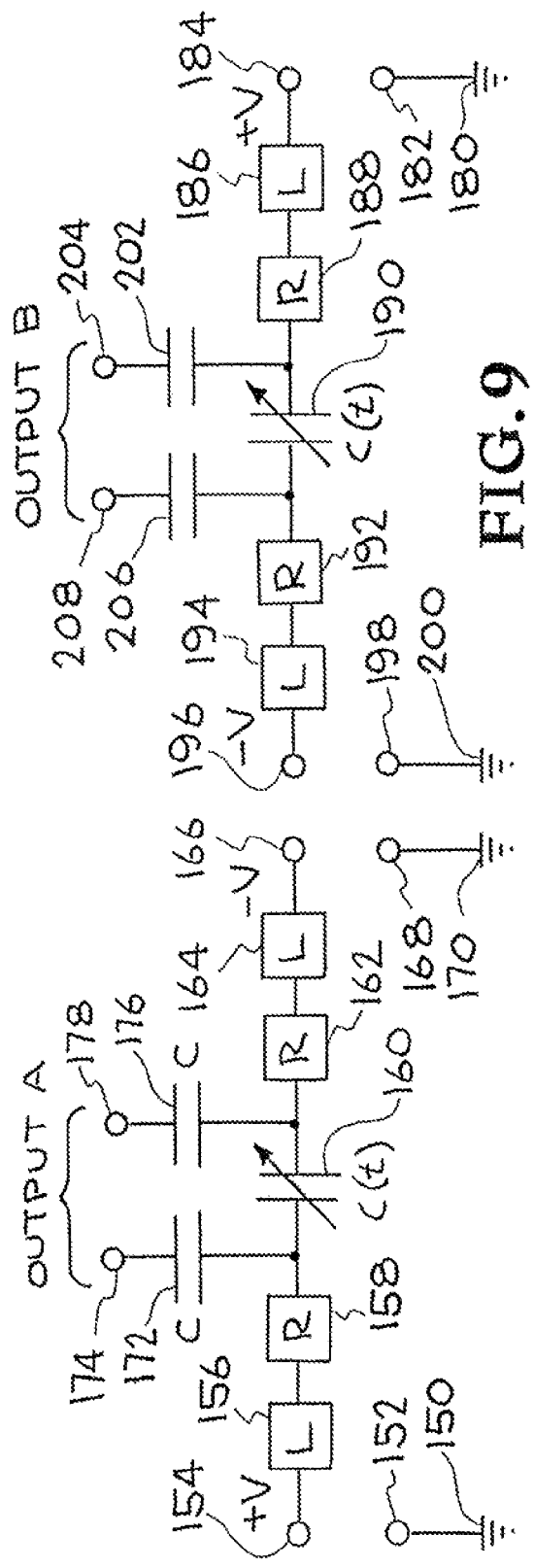
FIG. 9 illustrates schematically an electrostatic generator/motor and its associated charging circuits that include inductances.

FIG. 9 illustrates schematically an electrostatic generator/motor and its associated charging circuits in an embodiment that could be employed in implementing the new concept. As shown in the figure, inductances have been added to this "balanced" form of the system. In the circuit, the electrical impedance of the charging power supplies is assumed to be near-zero, as would be the case if their output were to be shunted by a large capacitor. When this is the case the resonant circuit described above consists of the two inductances in series with each other and with the time-varying capacitor of the electrostatic generator/motor. Also in series, to control the width of the resonance, are two charging resistors of 150 ohms each in the example to be given. The circuit of FIG. 9 can be used, e.g., with the embodiment of the electrostatic generator/motor described in FIGS. 4A and 48. Thus, the variable capacitors 160 and 190 in FIG. 9 correspond to one of the variable capacitors formed by plates 104 and 100 or by plates 104 and 102. The left portion of the circuit of FIG. 9 supports Output A at terminals 174 and 178 and includes negative DC power supply terminal 152 connected to ground at 150. Positive DC power supply terminal 154 is connected to inductor 156 which is connected to resistor 158 which is connected to one side of variable capacitor 160 and also is connected to capacitor 172 which is connected to terminal 174. A positive DC power supply terminal 168 is connected to ground at 170. A negative DC power supply terminal 166 is connect to inductor 164 which is connected to resistor 162 which is connected one side of variable capacitor 160 (opposite to that of resistor 158). Resistor 162 is also connected to capacitor 176 which is connected to output terminal 178. The right portion of the circuit of FIG. 9 supports Output B at terminals 204 and 208 and includes negative DC power supply terminal 182 connected to ground at 180. Positive DC power supply terminal 184 is connected to inductor 186 which is connected to resistor 188 which is connected to one side of variable capacitor 190 and also is connected to capacitor 202 which is connected to terminal 204. A positive DC power supply terminal 198 is connected to ground at 200. A negative DC power supply terminal 196 is connect to inductor 194 which is connected to resistor 192 which is connected one side of variable capacitor 190 (opposite to that of resistor 188). Resistor 192 is also connected to capacitor 206 which is connected to output terminal 208.

A computer code was written to analyze the performance of the circuit of FIG. 9. FIG. 10 is a plot of the (time-varying) resonant frequency of the above-described circuit, together with a line representing the generator output frequency in a case where the effect of parametric resonance is strong. Note the overlapping of the frequencies, a necessary condition for the resonant enhancement to occur. For this case the maximum, capacity of the time-varying condenser was 0.025 microfarads, and the inductance of each of the two charging inductances was 0.475 henrys.

Figure 11:
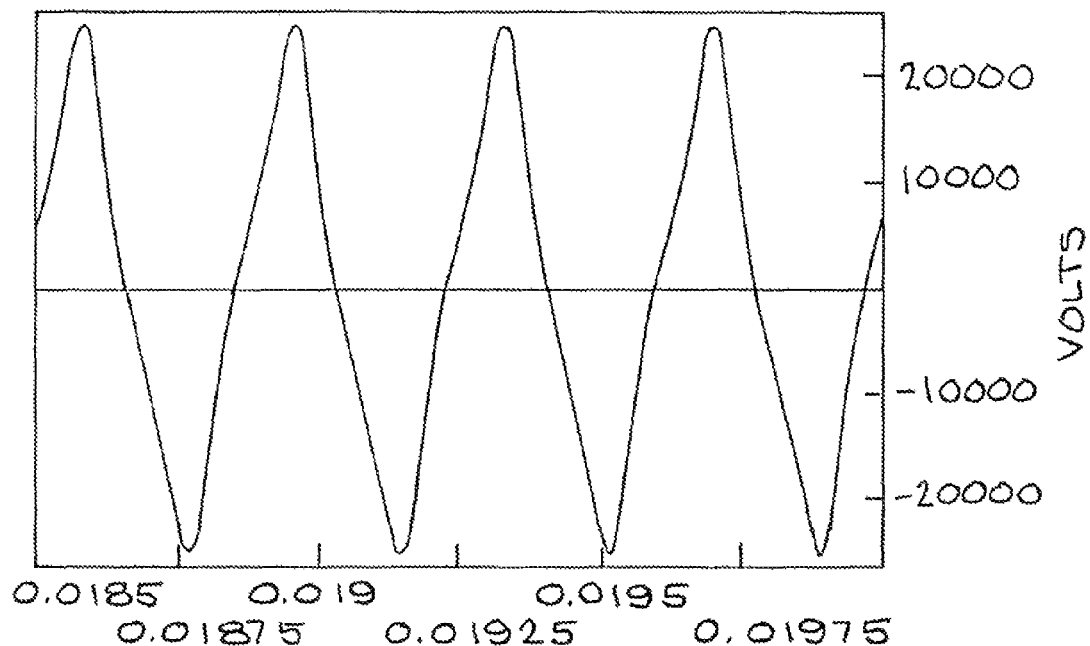
FIG. 11 shows the voltage generated from connecting Output A and Output 6 of FIG. 9 in series.

FIG. 11 shows the voltage generated from connecting Output A and Output B in series. In the example the peak generated voltage (plus and minus 25 kV) is much larger than, the applied voltages of plus and minus 5 kV. A typical way to accomplish the objective of summing the two outputs, in order to produce a single output at any desired voltage, would be to connect each output of the balanced circuit to separate primary windings of a isolation transformer. The secondary winding of this transformer would then produce a voltage output of the symmetrical form shown, in the figure. For each of the two circuits in the example the load has a resistive impedance of 18000 ohms. For this case the total output power at a frequency of 2.5 kiloHertz is 6.4 kW. If no charging inductances had been used the power output would have been only 1.7 KW. In other examples even larger gains from the parametric resonance effect were observed.

Figure 12:
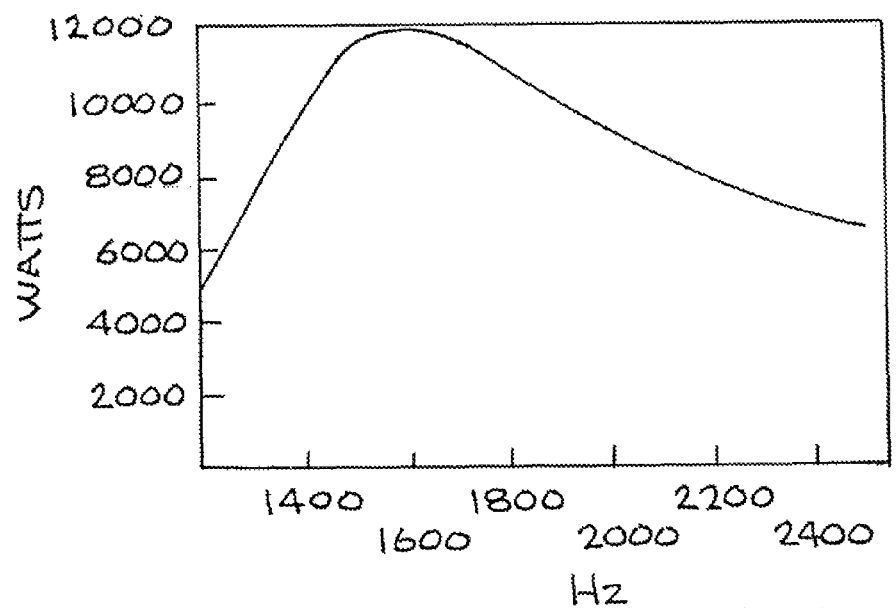
FIG. 12 shows the unregulated output of the generator as a function of frequency when the resonance is peaked at an intermediate frequency.
Figure 13:
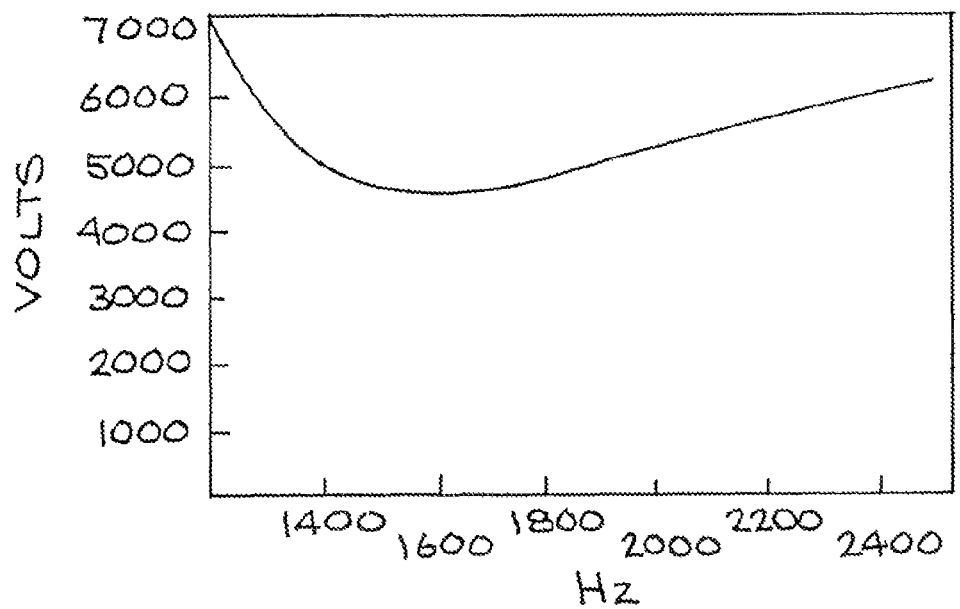
FIG. 13 shows a charging voltage that can be applied to produce a regulated output power from the circuit of FIG. 9.
Figure 14:
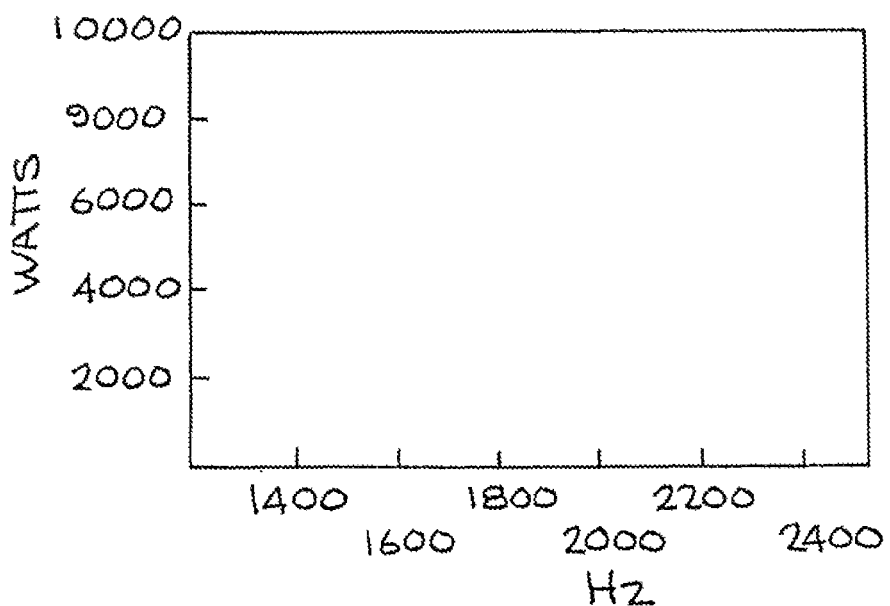
FIG. 14 shows the regulated output power as a function of frequency when the exciting voltage is changed in the manner shown in FIG. 13.

To illustrate the use of parametric resonance to flatten the output power of the electrostatic generator/motor as a function of frequency the plots of FIG. 12, 13, and 14 are shown. FIG. 12 shows the unregulated output of the generator as a function of frequency when the resonance is peaked at an intermediate frequency. The plot in FIG. 14 shows the regulated output power as a function of frequency when the exciting voltage is changed in the manner shown in FIG. 13. This modified version takes advantage of what might be described as a "regenerative parametric-resonance effect" to enhance the performance of the system.

Figure 15:
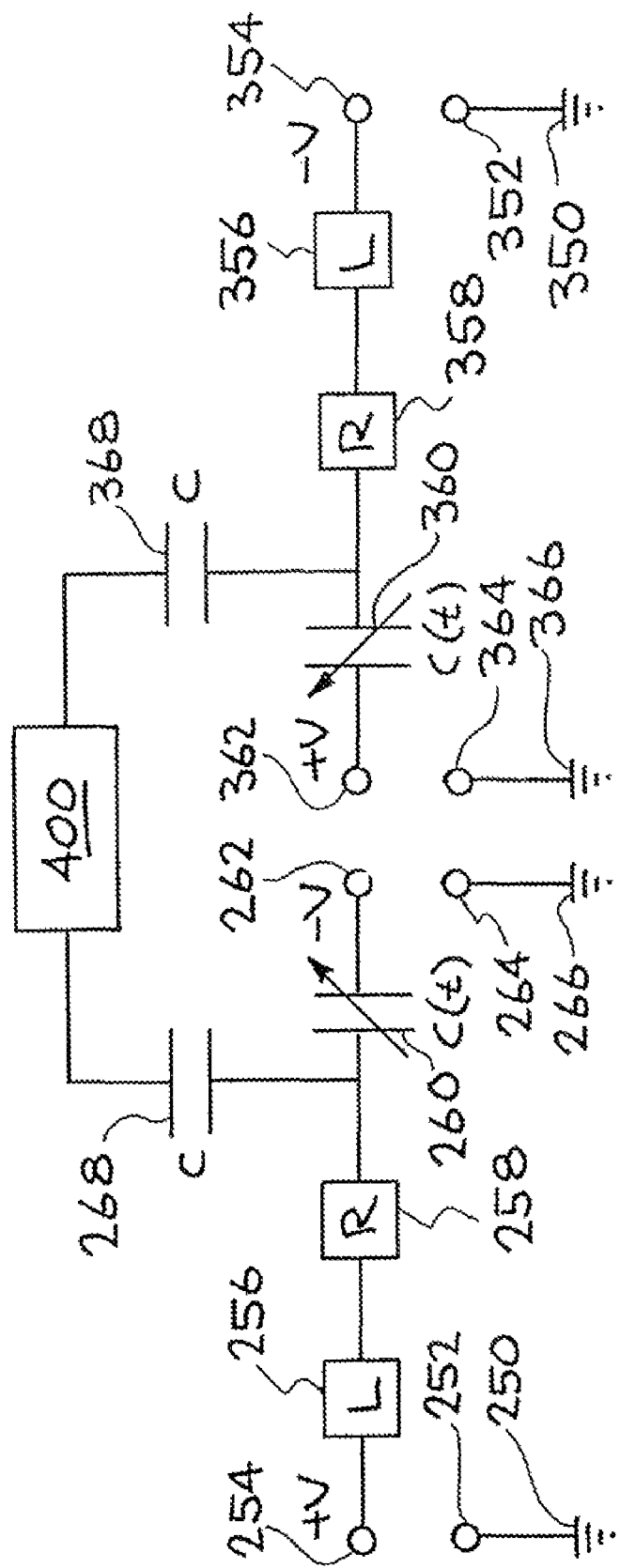
FIG. 15 depicts an exemplary dual balanced electrostatic generator that enhances the parametric resonance effect.

FIG. 15 depicts a modified form of the dual balanced electrostatic generator that has been shown by computer code simulation to enhance the parametric resonance effect. This circuit can, e.g., be used with the embodiment of FIGS. 4A and 4B where the variable capacitors 260 and 360 correspond to one of the variable capacitors formed by plates 104 and 100 or by plates 104 and 102. In the left portion of the circuit of FIG. 15, a negative DC power supply terminal 252 is connected to ground at 250. Positive DC power supply terminal 254 is connected to inductor 256 which is connected to resistor 258 which is connected to one side of variable capacitor 260. The other side of variable capacitor 260 is connected to a negative DC power supply terminal 262. A positive DC power supply terminal 264 is connected to ground at 266. Resistor 258 is also connected to capacitor 268 which is connected to load 400. In the right portion of the circuit of FIG. 15, a positive DC power supply terminal 352 is connected to ground at 350. Negative DC power supply terminal 354 is connected to inductor 356 which is connected to resistor 358 which is connected to one side of variable capacitor 360. The other side of variable capacitor 260 is connected to a positive DC power supply terminal 362. A negative DC power supply terminal 364 is connected to ground at 366. Resistor 358 is also connected to capacitor 368 which is connected to load 400. By using the load to provide an electrical coupling between the two circuits the effect is to lower the optimum load impedance while at the same time increasing the output power. Since the resonance effect in this case is very pronounced, it may in some cases be advantageous to "tune" the value of the charging inductances so as to preserve the resonance at its peak value as the generator frequency varies. Such, for example would be the case if the E-S generator is used in a flywheel energy storage system. "Tuning" of the inductance could be accomplished in several different ways. These include: (1) using several inductances connected sequentially in parallel so as to reduce the net inductance, then disconnecting them one-by-one to cause the net inductance to increase as the frequency decreases, or, (2) using several small inductances in series, sequentially shorting them out as needed to maintain the resonance, or, (3) changing the distance between two or more inductances in electrical series so as to vary the mutual inductance between them, thereby changing the net inductance. Other methods can be visualized to accomplish the same result.

FIG. 16A shows a top view of an electrostatic, generator/motor with a vertical array of stationary electrodes 500 and a rotor 502 made of insulating material. Dielectric strips 504 are attached to the rotor 502. FIG. 16B shows section A-A of FIG. 16A. This view reveals the vertical electrodes 500, dielectric strips 504 and metal strip backing 506. In this embodiment, the gap between the electrodes and the dielectric strips can increase as the rotor speed increases. See U.S. Pat. No. 6,858,962, incorporated herein by reference, for a discussion of the automatic regulation of voltage and power by using centrifugal force to change the diameter of a rotor, and thereby vary the radial gap in between the stator and the rotor, as a function of the angular velocity of the rotor.

REFERENCES

1. J. G. Trump, "Vacuum Electrostatic Engineering," DSc thesis, M.I.T., 1933.
2. J. G. Trump, "Electrostatic Sources of Electric Power," Electrical Engineering, 525, June 1947.
3. "Energy Conversion for Space Power," ed. N. W. Snyder, Academic Press, New York (1961).
4. A. W. Bright, B. Makin, "Modern Electrostatic Generators," Contemp, Physics, 10, 331 (1969).

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:
1. An apparatus, comprising:
a first outer plurality of sector plates that are stationary, wherein each sector plate of said first outer plurality of sector plates comprises an electrically conductive material and is electrically isolated;
a central plurality of stationary sector plates, wherein each sector plate of said central plurality of sector plates comprises an electrically conductive material and is electrically isolated;
a first rotor operably positioned to rotated between said first outer plurality of sector plates and said central plurality of stationary sector plates, wherein said first rotor comprises a varying thickness;
a second outer plurality of sector plates that are stationary, wherein each sector plate of said second outer plurality of sector plates comprises an electrically conductive material and is electrically isolated; and
a second rotor operably positioned to rotated between said second outer plurality of sector plates and said central plurality of stationary sector plates, wherein said second rotor comprises a varying thickness, wherein said central plurality of stationary sector plates are electrically connected together into two groups, forming thereby a first group of parallel-connected condensers connected to a first electrical lead and a second group of parallel connected condensers connected to a second electrical lead.

2. The apparatus of claim 1, wherein each sector plate of (1) said first outer plurality of sector plates, (2) said central plurality of stationary sector plates and (3) said second outer plurality of sector plates comprise conductive material.

3. The apparatus of claim 1, wherein said first rotor and said second rotor each comprise a material selected from the group consisting of dielectric material, metal and a mixture of dielectric material and metal.

4. The apparatus of claim 1, wherein said first rotor comprises a thickness that is varied with the same period as that of said central plurality of sector plates and said first outer plurality of sector plates and wherein said second rotor comprises a thickness that is varied with the same period as that of said central plurality of sector plates and said second outer plurality of sector plates.

5. The apparatus of claim 1, further comprising means for starting said first rotor and said second rotor to rotate.

6. The apparatus of claim 1, wherein at least one of said first outer plurality of sector plates, said second outer plurality of sector plates and said central plurality of stationary sector plates is displaced in phase by an angle smaller than the angle represented by the width of one sector plate of the respective sector plates.

7. The apparatus of claim 1, wherein said first outer plurality of sector plates are grounded, wherein said second outer plurality of sector plates are grounded, wherein said first electrical lead is connected to a load and is also connected through a first charging resistor to the positive terminal of a DC power supply that also comprises a negative terminal connected to ground and wherein said second electrical lead is connected to said load and is also connected through a second charging resistor to the positive terminal of a second DC power supply that also comprises a negative terminal connected to ground.

8. The apparatus of claim 1, wherein said first outer plurality of sector plates is connected to a capacitor that is connected to an output terminal, wherein said first outer plurality of sector plates is also connected through a resistor and an inductor to the positive terminal of a DC power supply that also comprises a negative terminal connected to ground, wherein said first electrical lead is connected to a second capacitor that is connected to a second output terminal, wherein said first electrical lead is also connected through a second resistor and a second inductor to the negative terminal of a second DC power supply that also includes a positive terminal connected to ground, wherein said second outer plurality of sector plates is connected to a third capacitor that is connected to third output terminal, wherein said second outer plurality of sector plates is also connected through a third resistor and a third inductor to the negative terminal of a third DC power supply that also comprises a positive terminal connected to ground, wherein said second electrical lead is connected to a fourth capacitor that is connected to a fourth output terminal and wherein said second electrical lead is also connected through a fourth resistor and a fourth inductor to the negative terminal of a fourth DC power supply that also includes a positive terminal connected to ground.

9. The apparatus of claim 1, wherein said first outer plurality of sector plates is connected to a capacitor, wherein said first outer plurality of sector plates is also connected through a resistor and an inductor to a grounded power supply, wherein said first electrical lead is connected to a second capacitor, wherein said first electrical lead is also connected through a second resistor and a second inductor to a second grounded power supply, wherein said second outer plurality of sector plates is connected to a third capacitor, wherein said second outer plurality of sector plates is also connected through a third resistor and a third inductor to a third grounded power supply, wherein said second electrical lead is connected to a fourth capacitor and wherein said second electrical lead is also connected through a fourth resistor and a fourth inductor to a fourth grounded power supply.

10. The apparatus of claim 1, wherein said first outer plurality of sector plates is connected through a resistor and an inductor to the positive terminal of a DC power supply that also comprises a negative terminal that is grounded, wherein said first electrical lead is connected to the negative terminal of a second DC power supply that also comprises a positive terminal that is connected to ground, wherein said second outer plurality of sector plates is connected through a second resistor and a second inductor to the negative terminal of a third DC power supply that also comprises a positive terminal that is grounded, wherein said second electrical lead is connected to the positive terminal of a second DC power supply that also comprises a negative terminal that is connected to ground.

11. The apparatus of claim 10, wherein said first electrical lead is connected to a first capacitor and wherein said second electrical lead is connected to a second capacitor.

12. The apparatus of claim 11, wherein said first capacitor is connected through a load to said second capacitor.

13. The apparatus of claim 1, wherein said first outer plurality of sector plates is connected through a resistor and an inductor to a grounded power supply , wherein said first electrical lead is connected to the negative terminal of a second DC power supply that also comprises a positive terminal that is connected to ground, wherein said second outer plurality of sector plates is connected through a second resistor and a second inductor to the negative terminal of a third DC power supply that also comprises a positive terminal that is grounded, wherein said second electrical lead is connected to the positive terminal of a second DC power supply that also comprises a negative terminal that is connected to ground.

14. The apparatus of claim 13, wherein said first electrical lead is connected to a first capacitor and wherein said second electrical lead is connected to a second capacitor.

15. The apparatus of claim 14, wherein said first capacitor is connected through a load to said second capacitor.

16. The apparatus of claim 1, wherein said first electrical lead is connected in parallel with a first inductor and an first output terminal and wherein said second electrical lead is connected in parallel with a second inductor and a second output terminal.

17. The apparatus of claim 1, wherein said first outer plurality of sector plates is connected in parallel with a first inductor and an first output terminal and wherein said second outer plurality of sector plates is connected in parallel with a second inductor and a second output terminal.

18. The apparatus of claim 1, wherein said first electrical lead and said second electrical lead are connected to a driver circuit to produce motor action.

19. The apparatus of claim 1, wherein rotation of said first rotor will produce a first periodically varying capacitance between said central plurality of stationary sector plates and said first outer plurality of sector plates and rotation of said second rotor will produce a second periodically varying capacitance between said central plurality of stationary sector plates and said second outer plurality of sector plates.

20. The apparatus of claim 1, wherein said first electrical lead is connected to a first capacitor, said apparatus further comprising a first charging circuit attached to said first electrical lead, wherein said first charging circuit comprises a first inductor, wherein said first inductor and first capacitor form an LC circuit resonant within a band of frequencies, wherein when said first rotor rotates, an output at said first lead will have at least one frequency within said band, wherein said second electrical lead is connected to a second capacitor, said apparatus further comprising a second charging circuit attached to said second electrical lead, wherein said second charging circuit comprises a second inductor, wherein said second inductor and second capacitor form a second LC circuit resonant within said band of frequencies, wherein when said second rotor rotates, a second output at said second lead will have at least one frequency within said band.

21. An apparatus, comprising:
a first outer plurality of sector plates that are stationary, wherein each sector plate of said first outer plurality of sector plates comprises an electrically conductive material and is electrically isolated;
a central plurality of stationary sector plates, wherein each sector plate of said central plurality of sector plates comprises an electrically conductive material and is electrically isolated;
a first rotor operably positioned to rotated between said first outer plurality of sector plates and said central plurality of stationary sector plates, wherein said first rotor comprises a varying thickness;
a second outer plurality of sector plates that are stationary, wherein each sector plate of said second outer plurality of sector plates comprises an electrically conductive material and is electrically isolated; and
a second rotor operably positioned to rotated between said second outer plurality of sector plates and said central plurality of stationary sector plates, wherein said second rotor comprises a varying thickness, wherein said central plurality of stationary sector plates are electrically connected together alternately, forming thereby a first group of parallel-connected condensers connected to a first electrical lead and a second group of parallel connected condensers connected to a second electrical lead.

22. A method, comprising simultaneously rotating a first rotor and a second rotor, wherein said first rotor is rotated between a central plurality of stationary sector plates and a first outer plurality of sector plates and wherein said second rotor is rotated between said central plurality of stationary sector plates and a second outer plurality of sector plates, wherein said first outer plurality of sector plates are stationary, wherein each sector plate of said first outer plurality of sector plates comprises an electrically conductive material and is electrically isolated, wherein each sector plate of said central plurality of sector plates comprises an electrically conductive material and is electrically isolated, wherein said first rotor is operably positioned to rotated between said first outer plurality of sector plates and said central plurality of stationary sector plates, wherein said first rotor comprises a varying thickness, wherein said second outer plurality of sector plates are stationary, wherein each sector plate of said second outer plurality of sector plates comprises an electrically conductive material and is electrically isolated, wherein said second rotor is operably positioned to rotated between said second outer plurality of sector plates and said central plurality of stationary sector plates and wherein said second rotor comprises a varying thickness, wherein said central plurality of stationary sector plates are electrically connected together into two groups, forming thereby a first group of parallel-connected condensers connected to a first electrical lead and a second group of parallel connected condensers connected to a second electrical lead.

* * * * *